Patented Oct. 6, 1936

2,056,255

UNITED STATES PATENT OFFICE 2,056,255

PARA-PARA'-DINITRO-DIPHENYLUREAS AND PROCESS OF PRODUCING SAME

Samuel Coffey and John Edgar Schofield, Huddersfield, England, assignors to Imperial Chemical Industries Limited, a corporation of Great Britain No Drawing. Application March 26, 1932, Serial No. 601,453. In Great Britain March 27, 1931

6 Claims. (Cl. 260—125)

This invention relates to organic nitro compounds, more particularly phenyl derivatives having a nitro group para to an amine nitrogen in the phenyl nucleus, and a process for the manufacture thereof.

As is well known, certain organic nitro compounds are difficult to produce free from isomerides. Among such compounds may be mentioned para-nitroanilines such as, for example, p-nitro-o-alkoxyanilines. Heretofore the customary method of preparing nitro-o-alkoxyanilines has been to nitrate the corresponding acyl-o-alkoxyaniline, a method which almost invariably gives rise to a mixture of nitrocompounds or may give little or no 4-nitro derivative. For instance, the nitration of acetyl-o-anisidine affords a mixture of acetyl-4- and 5-nitro-o-anisidines while the nitration of phthaloyl-arylamines gives rise to bodies in which the nitro group is meta to the amino group. (See Brady, Quick and Welling J. C. S., 1925, p. 2264).

It is an object of the present invention to provide a new and improved process for producing aniline derivatives containing a nitro group in the position para to the amine nitrogen. A more specific object is the production of para-nitro-ortho-alkoxyanilines by a series of reactions which proceed with great smoothness and with almost theoretical yields, little or no isomeride being formed. Further objects are the production of nitrated diphenyl ureas, in particular di(para-nitro-ortho-alkoxy phenyl) ureas, and in general to advance the art. Other objects will appear hereinafter.

These objects are accomplished according to the invention whereby: (1) diphenyl ureas having the position in the phenyl nuclei para to the amine nitrogens unsubstituted are treated with a nitrating agent; and (2) the nitrated product is treated with a hydrolyzing agent.

As a preferred embodiment, the invention is applied to the production of para-nitro-ortho-alkoxy anilines. We have discovered that the symmetrical ureas derived from ortho-alkoxyanilines when nitrated under known conditions yield dinitro compounds in which the nitro groups have entered substantially exclusively in the para positions to the amine nitrogen. Such di(p-nitro-o-alkoxyphenyl) ureas may be hydrolyzed to yield the corresponding 4-nitro-o-alkoxyanilines.

The invention will be further understood, but is not limited, by the following examples. The parts unless otherwise indicated are by weight.

EXAMPLE I

*Di-(4-nitro-2-methoxyphenyl)-urea*

Fifty four parts of di-2-methoxyphenyl-urea (0.2 gm. mol.) are suspended in 270 parts by volume of glacial acetic acid and the temperature is raised to 30–35° C. The mixture is agitated and 31.6 parts of 87.7% nitric acid (0.44 gm. mol.), dissolved in 50 parts by volume of glacial acetic acid, are added during 1½ hours at 30–35° C. The nitro compound separates during the course of the reaction as a bright canary yellow solid. The nitration mixture is stirred at 30–35° C. for ½ hour after the addition of the nitric acid and is then poured into 2000 parts of water with agitation. The suspension is now filtered and the residue washed free from acid and dried. The yield of di(4-nitro-2-methoxy-phenyl)-urea thus obtained is about 99% of theory.

*Hydrolysis.*—Fifty parts of di-(4-nitro-2-methoxyphenyl)-urea, 150 parts of water, and 50 parts by volume of 35% aqueous ammonia, are charged into an autoclave, stirred and heated for 4 hours at 150° C. The autoclave is allowed to cool and the charge filtered. The residue is washed with water, dissolved in 250 parts of 35% sulfuric acid, filtered and the 5-nitro-o-anisidine (4-nitro-2-methoxy-aniline) precipitated by pouring the clear acid solution into water. The solid product is then filtered, washed free from acid and dried. A further small quantity may be recovered from the acid mother liquors on making alkaline with caustic soda. The total yield of 5-nitro-o-anisidine is about 84% of theory.

When di-2-ethoxyphenylurea is similarly treated a similar yield of substantially pure 5-nitro-o-phenetidine is obtained.

EXAMPLE II

*Di(4-nitro-2:5-dimethoxy-phenyl) urea*

Thirty-three parts of di-(2,5-dimethoxy-phenyl)urea (0.1 gm. mol.) are suspended in 165 parts by volume of glacial acetic acid and the temperature is raised to 30–35° C. The mixture is agitated and 16 parts of 86.3% nitric acid (0.22 gm. mol.), dissolved in 30 parts by volume glacial acetic acid, are added during 1 hour at 30–35° C. External cooling is needed. The nitration mixture is stirred for ½ hour at 30–35° C. after the addition of the nitric acid and is then poured into 1000 parts agitated water. The suspension is now filtered and the residue washed free from acid and dried. Forty parts of bis(4-nitro-2,5-dimethoxy-phenyl)urea, M. P. 274–276° C. corresponding to a 95% yield, are obtained.

*Hydrolysis.*—The crude bis(4-nitro-2:5-dimethoxy-phenyl) urea on hydrolysis with aqueous ammonia as in Example I gives 2,5-dimethoxy-p-nitraniline of M. P. 152–160° C. A sample of the crude base recrystallized from toluene had a melting point of 158–160° C.

Example III

Di(5-chloro-4-nitro-2-methoxyphenyl)urea

Sixty-eight parts of di(5-chloro-2-methoxy-phenyl)urea (0.2 gm. mol.) are added in ½ hour at 90–95° C. to 180 parts of 35% nitric acid (1. gm. mol.). The nitration mixture is stirred for a further hour at 90–95° C. and poured into 1000 parts of water. The suspension is filtered and the residue washed free from acid and dried. Eighty-three parts of di(5-chloro-4-nitro-2-methoxy-phenyl)urea, M. P. 270–272° C., corresponding to a 96.5% yield, are obtained. This product is hydrolyzed as described in Example I, giving a good yield of 5-chloro-4-nitro-o-anisidine.

While the process is preferably applied to the treatment of alkoxy derivatives of diphenyl ureas, any diphenyl urea having the positions in the phenyl nuclei para to the amine nitrogen free may be employed. The other positions of the phenyl nuclei, that is to say, the positions other than those occupied by the amine nitrogens and the positions para thereto, may be substituted or unsubstituted. In general, of such substituted diphenyl ureas, we prefer to employ those in which the phenyl nuclei contain one or more alkoxy, alkyl, and/or halogen groups. The preferred substituents of the alkoxy group are the —OCH₃, —OC₂H₅, —OC₃H₇ and —OC₄H₉ radicals; of the alkyl, the —CH₃, —C₂H₅ radicals; and of the halogens, chlorine and bromine. It will be apparent that unless symmetrical diphenyl ureas are employed, that is, diphenyl ureas having the same substituents correspondingly placed in the phenyl nuclei, mixtures of the various anilines will be produced upon hydrolysis and this would be undesirable for most purposes.

As indicated by the examples, the nitration is preferably effected in the presence of a solvent or suspension medium such as acetic acid. Generally speaking, any solvent or suspension medium which is inert to the reactants or does not affect the reaction unfavorably may be employed.

While the hydrolysis is preferably conducted in solution with an alkaline hydrolyzing agent, it may be effected by means of any hydrolyzing agent favorable to the breaking of the carbon-nitrogen linkage of the group

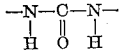

It will be recognized that our invention constitutes a valuable advance in the preparation of nitro-phenyl derivatives. In view of present knowledge it is extremely surprising that the symmetrical ureas derived from o-alkoxyaniline and which, in effect, are themselves acyl-amino bodies should yield on nitration compounds in which the nitro group attaches itself substantially exclusively in the position para to the amino nitrogen atom, to produce a quantitative yield of para nitro body.

The products are valuable in the chemical industry, particularly as intermediates for the production of dyes.

As many apparent and widely different embodiments of this invention may be made without departing from the spirit thereof, it is to be understood that we do not limit ourselves to the foregoing examples or description except as indicated in the following claims.

We claim:

1. In the manufacture of nitro-phenyl derivatives, the process which comprises suspending about 54 parts of di-2-methoxy-phenyl-urea in 270 parts by volume of glacial acetic acid, raising the temperature to 30° C. to 35° C., maintaining said temperature while adding to the mixture with agitation and during a period of about one and one-half hours a solution of 31.6 parts of 87.7% nitric acid in 50 parts by volume of glacial acetic acid, stirring the nitration mixture for about another half-hour at a temperature of about 30° C. to 35° C., pouring the resultant product into about 2000 parts of water, with agitation, and recovering the solid material comprising di-(4-nitro-2-methoxy-phenyl)-urea.

2. Diphenyl ureas having nitro radicals in the phenyl nuclei para to the amine nitrogens of the urea group and having at least one of the positions other than the para positions of the phenyl nuclei occupied by a radical selected from the group consisting of halogen, alkyl and alkoxy.

3. The compound, di-(4-nitro-2-methoxy-phenyl) urea.

4. The compound, di-(4-nitro-2,5-dimethoxyphenyl) urea.

5. The compound, di-(5-chloro-4-nitro-2-methoxy-phenyl) urea.

6. A compound of the general formula

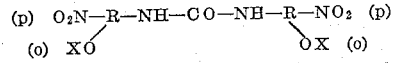

wherein R is an arylene radical of the benzene series, X is an alkyl group, and (p) and (o) respectively designate the positions of the nitro and alkoxy groups with respect to the NH groups.

SAMUEL COFFEY.
JOHN EDGAR SCHOFIELD.